United States Patent Office 3,655,901
Patented Apr. 11, 1972

3,655,901
METHOD OF INHIBITING THE FORMATION OF PHENYLETHANALAMINE-N-METHYL TRANSFERASE WITH 2-AMINOBENZIMIDAZOLES
Norman P. Jensen, Watchung, and Tsung-Ying Shen and Thomas B. Windholz, Westfield, N.J., assignors to Merck & Co., Inc., Rahway, N.J.
No Drawing. Continuation-in-part of application Ser. No. 8,002, Feb. 2, 1970. This application July 30, 1970, Ser. No. 59,697
Int. Cl. A61k 27/00
U.S. Cl. 424—273
1 Claim

ABSTRACT OF THE DISCLOSURE

New 2-aminobenzimidazoles useful in the inhibition of phenylethanolamine-N-methyl transferase.

This application is a continuation-in-part of U.S. Serial No. 8,002, filed Feb. 2, 1970.

This invention relates to new chemical compounds. More specifically, this invention relates to new 2-aminobenzimidazoles. Still more specifically, this invention relates to compounds having the following general formula:

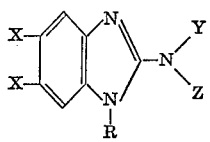

wherein R is hydrogen or loweralkyl; X is trifluoromethyl, chloro or nitro; and Y and Z each may be hydrogen, loweralkyl or trifluoromethyl provided that X may not be chloro when R, Y and Z are hydrogen.

A final step in epinephrine biosynthesis is the transfer of a methyl group from S-adenosylmethionine to the amine nitrogen of norepinephrine. This step is catalyzed by phenylethanolamine-N-methyl transferase. This invention further relates to a method of inhibiting the formation of phenylethanolamine-N-methyl transferase utilizing the compounds of this invention, thereby resulting in a decrease in the formation of adrenal epinephrine.

These compounds have clinical utility in situations where there is a selective overproduction of adrenal epinephrine such as in the treatment of narcotic addiction, for example the management and control of morphine withdrawal, the treatment of various emotional states, for example anticipatory, painful and anxiety states in normal and psychiatric subjects, in particular, for the treatment of anxiety neurosis, and the prophilactic control of cardiovascular disorders characterized by increased heat rate and cardiac output management of heart failure, cardiac shock or other situations in which stress exerts pressure upon cardiac performance, as for example, the management of myocardial infarctions.

The compounds of this invention also are useful as fungicides and coccidiostats and may be used to treat diseases and conditions characterized by the presence of coccidia or fungi.

The nitro and trifluoromethyl substituted 2-aminobenzimidazoles may be prepared by reacting the substituted phenyldiamine with cyanogen bromide in aqueous solution and the halo 2-aminobenzomidazoles may be prepared by chlorinating a halo-substituted benzimidazolone and amidating the resulting 2-chlorobenzimidazole as may be seen by the procedures illustrated in the following flow sheets:

FLOW SHEET I

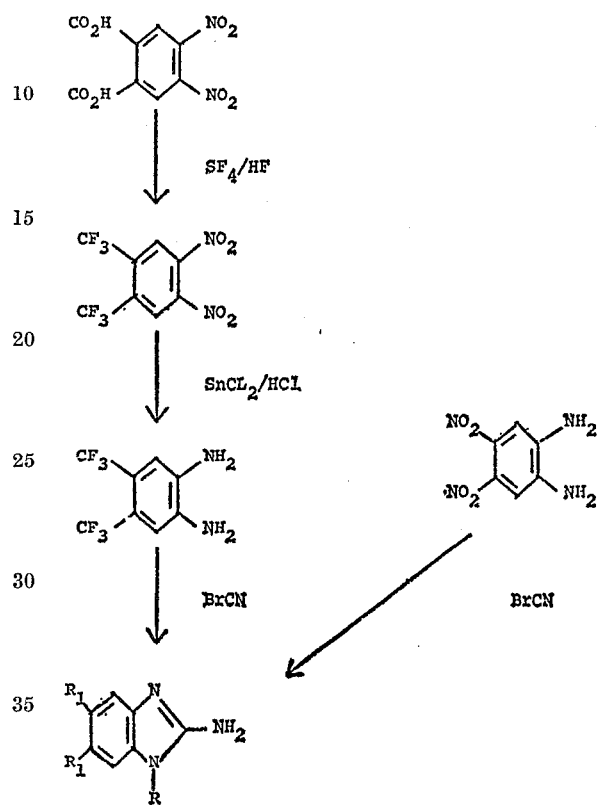

Equivalents:

R is hydrogen or loweralkyl; and
$R_1$ is trifluoromethyl or nitro.

FLOW SHEET II

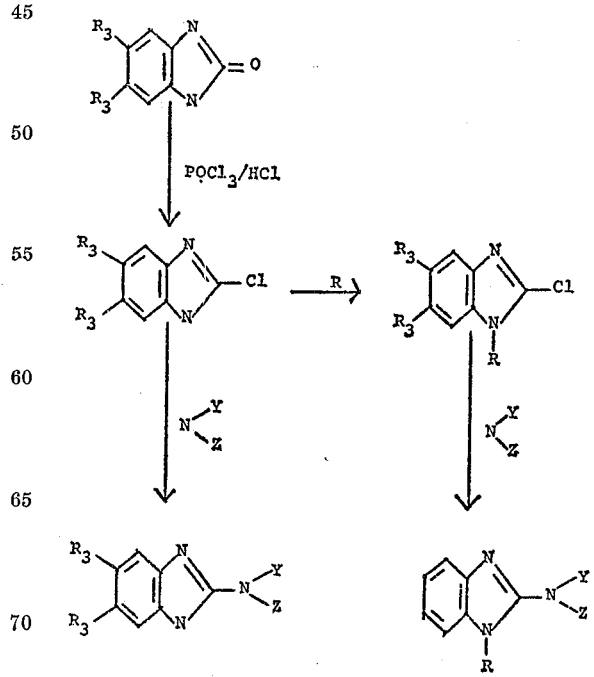

Equivalents:
  R is hydrogen or loweralkyl;
  $R_3$ is chloro; and
  Y and Z each may be hydrogen or loweralkyl.

A preferred embodiment of this invention is a method of inhibiting phenylethanolamine-N-methyl transferase which comprises the administration to a patient (animal or human) of a therapeutically effective amount of the compounds of the above formula. In general the daily dose can be from 0.05 mg./kg. to 150 mg./kg. per day and preferably from 1 mg./kg. to 100 mg./kg. per day, bearing in mind, of course, that in selecting the appropriate dosage in any specific case, consideration must be given to the patient's weight, general health, metabolism, age and other factors which influence response to the drug.

Another embodiment of this invention is the provision of pharmaceutical compositions in dosage unit form which comprise from about 1 mg. to 500 mg. of a compound of the above formula.

The pharmaceutical compositions may be in a form suitable for oral use, for example, as tablets, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active benzimidazole ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatin or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period.

Formulations for oral use may also be presented as hard gelatin capsules wherein the active ingredient is mixed with an inert solid diluent, for example calcium carbonate, calcium phosphate or kaolin, or as soft gelatin capsules wherein the active ingredient is mixed with an oil medium, for example arachis oil, liquid paraffin or olive oil.

Aqueous suspensions contain the active benzimidazole in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example, ethyl, or n-propyl, p-hydroxy benzoate, one or more coloring agents, one or more flavoring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an antioxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters of partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion it is apparent that the compositions of this invention can be administered orally or parenterally. The term parenteral as used herein includes subcutaneous injection, intravenous, intramuscular, or intrasternal injection or infusion techniques.

The following examples are presented to further illustrate the invention:

EXAMPLE 1

(A) 4,5-dinitro-1,2-bis-trifluoromethylenbenze

A 7.0 g. portion of 4,5-dinitrophthalic acid (12 Chem. Pharm. Bull. 14, 1944) is heated for 8 hours at 140° C. in a steel bomb with 75 g. of sulfur tetrafluoride and 35 ml. of hydrofluoric acid. The excess reagents are evaporated at room temperature and the residue is extracted with chloroform. The chloroform extract is filtered and concentrated in vacuo to a solid which is dissolved in 30 ml. of ether. The ether solution is dried with magnesium sulfate and evaporated with a stream of nitrogen. The residue is butyrated with 20 ml. of hot n-hexane to give crude product, M.P. 93–97°. An analytical sample is obtained by recrystallization from hexane followed by sublimation, M.P. 96–97°.

EXAMPLE 2

4,5-bis-trifluoromethyl o-phenylenediamine

To a solution of 10 g. of stannous chloride dihydrate in 40 ml. of concentrated hydrochloric acid, which is cooled with an ice-bath, is added 2.00 g. of 4,5-dinitro-1,2-bis-trifluoromethylbenzene. After stirring for 15 minutes the ice-bath is removed, but is replaced intermittently to keep the temperature <40° C. After stirring for 16 hours the mixture is cooled to 0° C. and the precipitate collected on a filter and washed with 4× 10 ml. cold 1:1 hydrochloric acid. This precipitate is then slurried with excess ammonia and crude product is collected and washed with water, M.P. 64–65.5°. An analytical sample is obtained by sublimation at 60°/50 mm., M.P. 65–66°.

EXAMPLE 3

2-amino-5,6-bis-(trifluoromethyl)benzimidazole

A solution of 1.03 of cyanogen bromide in 28 ml. of water and 14 ml. of methanol is stirred and cooled to 8° C. and 2.04 g. of 4,5-bis-trifluoromethyl o-phenylenediamine is added. The mixture is stirred at room temperature for 4 days. An additional 0.95 g. of cyanogen bromide is added after 1 day. The mixture is then made basic with concentrated ammonia and concentrated in vacuo to a brown oil. This residue is triturated with 20 ml. of water and then warmed in another 20 ml. of water. Cooling and scratching gives crude product, M.P. 173–177°. Purification is achieved by washing with chloroform and decolorizing on a methanol solution with activated charcoal followed by recrystallization from water to give 2-amino-5,6-bis-(trifluoromethyl)benzimidazole, M.P. 179–181.5°.

EXAMPLE 4

2-amino-5,6-dinitrobenzimidazole complex with dimethylformamide

A solution of 6.0 g. of cyanogen bromide in 100 ml. of water and 50 ml. of methanol is cooled with an ice-bath and 9.9 g. of 4,5-dinitro-o-phenylenediamine [prepared by the method of G. W. H. Cheesman, J. Chem. Soc., 1175 (1962)] is added. The mixture is stirred for 15 days at room temperature during which time about 1 g. of additional cyanogen bromide is added each day. The mixture is filtered and made basic with concentrated ammonia. A precipitate is separated, collected, and recrystallized from dimethylformamide to give an analytical sample of the mono-dimethylformamide solvate of the product, M.P. ~310°.

EXAMPLE 5

2,5,6-trichlorobenzimidazole

A 20 g. portion of 5,6-dichlorobenzimidazolone is refluxed in 300 ml. of phosphorous oxychloride for 1½ hour. Hydrogen chloride gas is then bubbled in and the mixture is refluxed for an additional 18 hours. Most of the excess phosphorous oxychloride is removed by distillation at 21°/12 mm. and the residue is cautiously decomposed with water. The resultant mixture is then extracted with 500 and 3×100 ml. of hot concentrated hydrochloric acid. This extract is slowly made basic with concentrated ammonia until a precipitate appears. The precipitate is removed by filtration (filtrate still strongly acidic) and the filtrate made basic with more concentrated ammonia. Collection of the resultant precipitate gives 2,5,6-trichlorobenzimidazole.

EXAMPLE 6

5,6-dichloro-2-dimethylaminobenzimidazole

A 1.7 g. portion of 2,5,6-trichlorobenzimidazole is heated in a sealed tube with 8.0 ml. of 40% dimethylamine solution for 6 hours at 155° C. The resultant mixture is diluted with 75 ml. of water and crude product is collected on a filter, M.P. 250–258°. An analytical sample is obtained by sublimation at 150°/50μ., M.P. 253–257°.

EXAMPLE 7

5,6-dichloro-2-dimethylamino-1-methylbenzimidazole

A 0.64 g. portion of 5,6 - dichloro-2-dimethylaminobenzimidazole is added to 1.5 ml. of 5 N sodium hydroxide and 5 ml. of water. The mixture is cooled and stirred and 0.55 ml. of dimethylsulfite is added. The mixture is stirred for 12 hours and 2.0 ml. portions of sodium hydroxide plus 0.65 ml. portions of dimethylsulfate are added every 3 hours. The mixture is then diluted with water and the resultant precipitate collected and dissolved in 20 ml. of chloroform. The chloroform solution is dried with magnesium sulfate, decolorized with activated charcoal and concentrated in vacuo to residue. This residue is extracted with ether. The ether extracts are concentrated in vacuo to give crude product which after two recrystallizations from ether gives product, M.P. 72–74°.

EXAMPLE 8

1-methyl-2,4,5-trichlorobenzimidazole

A solution of 1.44 g. of 2,4,5-trichlorobenzimidazole in 5 ml. of water and 4.5 ml. of 5 N sodium hydroxide is cooled in an ice-bath and 1.5 ml. of dimethylsulfate is added. Cooling is continued and the mixture is stirred for 50 minutes before an additional 4.5 ml. of 5 N sodium hydroxide and 1.5 ml. of dimethylsulfate is added. After another hour of stirring, 50 ml. of water is added and the precipitate is collected and washed with water to yield 1-methyl-2,4,5-trichlorobenzimidazole, M.P. ~175°.

EXAMPLE 9

2-amino-5,6-dichloro-1-methylbenzimidazole

A mixture of 0.80 g. of 1-methyl-2,4,5-trichlorobenzimidazole and 3 ml. of concentrated ammonia is heated in a sealed tube for 6 hours at 200° C. The resultant precipitate is collected and washed with water. A 500 mg. portion of this material is sublimed at 100°/50μ. The material which remains unsublimed is then purified by preparative thin layer chromatography on silica gel plates using 10% methanol in chloroform as an eluant. This gives crude product which is sublimed at 130°/45 mμ. to give a 75% recovery of material, M.P. 246–247°.

EXAMPLE 10

A mixture of 250 parts of 2-amino-5,6-bis-(trifluoromethyl)-benzimidazole and 25 parts of lactose is granulated with suitable water, and to this is added 100 parts of maize starch. The mass is passed through a 16-mesh screen. The granules are dried at a temperature below 60° C. The dry granules are passed through a 16-mesh screen, and mixed with 3.8 parts of magnesium stearate. They are then compressed into tablets suitable for oral administration.

EXAMPLE 11

A mixture of 50 parts of 5,6-dichloro-2-dimethylaminobenzimidazole, 3 parts of the calcium salt of lignin sulphonic acid, and 237 parts of water is ball-milled until the size of substantially all of the particles of benzyl ethyl sulfoxide is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 12

A mixture of 250 parts of 2 - amino-5,6-dichloro-1-methylbenzimidazole, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 13

A mixture of 500 parts of 5,6 - dichloro-2-dimethylamino-1-methylbenzimidazole, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

What is claimed is:

1. A method of inhibiting the formation of phenylethanolamine-N-methyl transferase comprising the administration to a patient of a therapeutically effective amount of a compound of the formula:

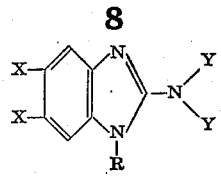

wherein R is hydrogen or loweralkyl; X is chloro, trifluoromethyl, or nitro; and Y is hydrogen, loweralkyl or trifluoromethyl provided that X may not be chloro when R and Y are hydrogen.

References Cited
UNITED STATES PATENTS

| | | | |
|---|---|---|---|
| 3,399,212 | 8/1968 | Hoover et al. | 260—309.2 |
| 3,401,171 | 9/1968 | Craig et al. | 260—309.2 |
| 3,480,642 | 11/1969 | Stedman | 260—309.2 |
| 3,401,174 | 9/1969 | Woods et al. | 260—309.2 |

OTHER REFERENCES

Horner et al.: J. Med. Chem., vol. 11, pp. 946–949 (1968).

Joseph et al.: J. Heter. Chem., vol. 3, pp. 107–108 (1966).

STANLEY J. FRIEDMAN, Primary Examiner

U.S. Cl. X.R.

260—309.2